(12) United States Patent
Low et al.

(10) Patent No.: US 10,190,504 B2
(45) Date of Patent: Jan. 29, 2019

(54) COMBUSTOR SEAL MISTAKE-PROOFING FOR A GAS TURBINE ENGINE

(71) Applicant: United Technologies Corporation, Hartford, CT (US)

(72) Inventors: Kevin Joseph Low, Portland, CT (US); Joey Wong, Enfield, CT (US)

(73) Assignee: United Technologies Corporation, Farmington, CT (US)

(*) Notice: Subject to any disclaimer, the term of this patent is extended or adjusted under 35 U.S.C. 154(b) by 670 days.

(21) Appl. No.: 14/432,339

(22) PCT Filed: Oct. 1, 2013

(86) PCT No.: PCT/US2013/062874
§ 371 (c)(1),
(2) Date: Mar. 30, 2015

(87) PCT Pub. No.: WO2014/099097
PCT Pub. Date: Jun. 26, 2014

(65) Prior Publication Data
US 2015/0240724 A1    Aug. 27, 2015

Related U.S. Application Data

(60) Provisional application No. 61/708,593, filed on Oct. 1, 2012.

(51) Int. Cl.
| | |
|---|---|
| *F02C 7/28* | (2006.01) |
| *F01D 9/02* | (2006.01) |
| *F01D 11/00* | (2006.01) |
| *F02C 3/04* | (2006.01) |

(52) U.S. Cl.
CPC ............ *F02C 7/28* (2013.01); *F01D 9/023* (2013.01); *F01D 11/00* (2013.01); *F01D 11/003* (2013.01); *F02C 3/04* (2013.01); *F23R 2900/00012* (2013.01); *Y10T 29/4932* (2015.01)

(58) Field of Classification Search
CPC .... F02C 7/28; F02C 3/04; F01D 9/023; F01D 11/00; F01D 11/003; F01D 11/005; Y10T 29/4932; F23R 2900/00012; F05D 2240/55
USPC .......................................................... 60/722
See application file for complete search history.

(56) References Cited

U.S. PATENT DOCUMENTS

| | | |
|---|---|---|
| 4,185,686 A | 1/1980 | Pereira |
| 4,274,805 A | 6/1981 | Holmes |
| 5,289,677 A * | 3/1994 | Jarrell ................. F23R 3/60 60/752 |
| 5,407,319 A | 4/1995 | Harrogate et al. |

(Continued)

OTHER PUBLICATIONS

Extended European Search Report, for European Patent Application No. 13865022.1, dated Jul. 7, 2016, 9 pages.

(Continued)

*Primary Examiner* — Phutthiwat Wongwian
*Assistant Examiner* — Loren Edwards
(74) *Attorney, Agent, or Firm* — Kinney & Lange, P.A.

(57) ABSTRACT

A combustor seal for use between a downstream end of a combustor and a turbine vane includes a seal body and a plurality of seal alignment features. The plurality of seal alignment features projects from the seal body. The seal alignment features are arranged such that there is only one alignment of the combustor seal with the turbine vane.

13 Claims, 6 Drawing Sheets

(56) References Cited

U.S. PATENT DOCUMENTS

| | | | |
|---|---|---|---|
| 5,480,162 | A | 1/1996 | Beeman, Jr. |
| 5,785,492 | A | 7/1998 | Belsom et al. |
| 6,240,731 | B1 | 6/2001 | Hoke et al. |
| 6,418,727 | B1 | 7/2002 | Rice et al. |
| 6,658,853 | B2 | 12/2003 | Matsuda et al. |
| 8,266,914 | B2 | 9/2012 | Hawie et al. |
| 2001/0036403 | A1 | 11/2001 | Heyes |
| 2011/0008156 | A1 | 1/2011 | Prentice et al. |

OTHER PUBLICATIONS

International Searching Authority, International Search Report and Written Opinion, dated Jul. 7, 2014, 13 pages.

\* cited by examiner

COMBUSTOR SEAL MISTAKE-PROOFING FOR A GAS TURBINE ENGINE

CROSS-REFERENCE TO RELATED APPLICATION(S)

This application claims benefit to International Application No. PCT/US2013/062874 filed Oct. 1, 2013 entitled "COMBUSTOR SEAL MISTAKE-PROOFING FOR A GAS TURBINE ENGINE" and claims benefit of Provisional Application No. 61/708,593, filed Oct. 1, 2012 entitled "COMBUSTOR SEAL MISTAKE-PROOFING FOR A GAS TURBINE ENGINE", which is incorporated herein.

BACKGROUND

The present invention relates to a turbine engine. In particular, the invention relates to a combustor seal for a gas turbine engine.

A turbine engine ignites compressed air and fuel in a combustion chamber, or combustor, to create a flow of hot combustion gases to drive multiple stages of turbine blades. The turbine blades extract energy from the flow of hot combustion gases to drive a rotor. The turbine rotor drives a fan to provide thrust and drives a compressor to provide a flow of compressed air. Vanes ahead of, and interspersed between, the multiple stages of turbine blades align the flow of hot combustion gases for an efficient attack angle on the turbine blades.

In most instances, a portion of the flow of compressed air flows around the combustor to cool the combustor and to cool components downstream from the combustor. Leakage of the compressed air into the flow of combustion gases may deprive the downstream components of the cooling necessary to prolong their service life. The loss of compressed air into the flow of combustion gases may also lead to increased compressed air requirements. Energy expended on compressing air that leaks into the flow of combustion gases is not available to produce thrust, and engine efficiency is reduced.

Seals are generally employed between components to prevent leakage of the compressed air into the flow of combustion gases. Improvements in the effectiveness of such a combustor seal can reduce leakage of compressed air into the flow of combustion gases and improve the overall efficiency of the turbine engine.

SUMMARY

An embodiment of the present invention is a combustor seal for use between a downstream end of a combustor and a turbine vane includes a seal body and a plurality of seal alignment features. The plurality of seal alignment features projects from the seal body. The seal alignment features are arranged such that there is only one alignment of the combustor seal with the turbine vane.

Another embodiment of the present invention is a gas turbine engine including an outer casing, a combustor within the outer casing, a plurality of vane alignment features within and connected to the outer casing, a turbine vane downstream of the combustor, and a combustor seal. The turbine vane includes an outer platform surface facing in an upstream axial direction, and an alignment feature for engaging with the plurality of vane alignment features to align the turbine vane to the outer casing. The combustor seal is in contact with the platform surface and a downstream end of the combustor configured to seal a gap defined between the combustor and the outer platform surface of the turbine vane. The combustor seal includes a seal body, and a plurality of seal alignment features projecting from the seal body. The plurality of seal alignment features is configured to engage the plurality of vane alignment features for aligning the combustor seal relative to the turbine vane, and arranged such that there is only one alignment in which all of the plurality of seal alignment features engage all of the plurality of vane alignment features.

Another embodiment of the present invention is method of installing a combustor seal into a gas turbine engine includes inserting the combustor seal into the gas turbine engine axially adjacent a vane support, and rotating the combustor seal about an engine center axis to align the combustor seal relative to the vane support.

DETAILED DESCRIPTION

This application claims the benefit of U.S. Provisional Application No. 61/708,593 filed Oct. 1, 2012, and incorporated herein by reference. In accordance with the present disclosure, an axially loaded combustor seal is provided which can improve the efficiency of a gas turbine engine. Each of the turbine vanes immediately downstream of the combustor in a gas turbine engine may have a slightly unique shape and position relative to the downstream end of the combustor. In use, the combustor seal between the vanes and the combustor may wear against the vanes and provide a seal surface that more closely matches the unique shape and position of the vanes. While this provides for a better seal quality, this customized relationship between the worn-in combustor seal and the vanes means that the combustor seal may need to be replaced if the relationship between combustor seal and vanes is disturbed. Such a disturbance may happen, for example, if the combustor and the vanes are separated and the combustor seal is removed during maintenance of the gas turbine engine. It is extremely unlikely that once the gas turbine engine is reassembled, with the combustor seal reinstalled between the combustor and the vanes, the beneficial wear pattern of the combustor seal would happen to match each of the vanes as it did prior to disassembly. Such a mismatch between the combustor seal and the vanes may result in seal performance that is worse than a new, unworn combustor seal.

Embodiments of the present disclosure provide a plurality of seal alignment features for ensuring that the combustor seal retains the same circumferential alignment relative to the vanes. This ensures a substantial match between the beneficial wear pattern of the combustor seal, and the unique shape and position of the vanes upon reassembly of the gas turbine engine. The seal alignment features are such that installation of the worn-in combustor seal is mistake proof, in that it can only be installed in one orientation.

Figure 1:
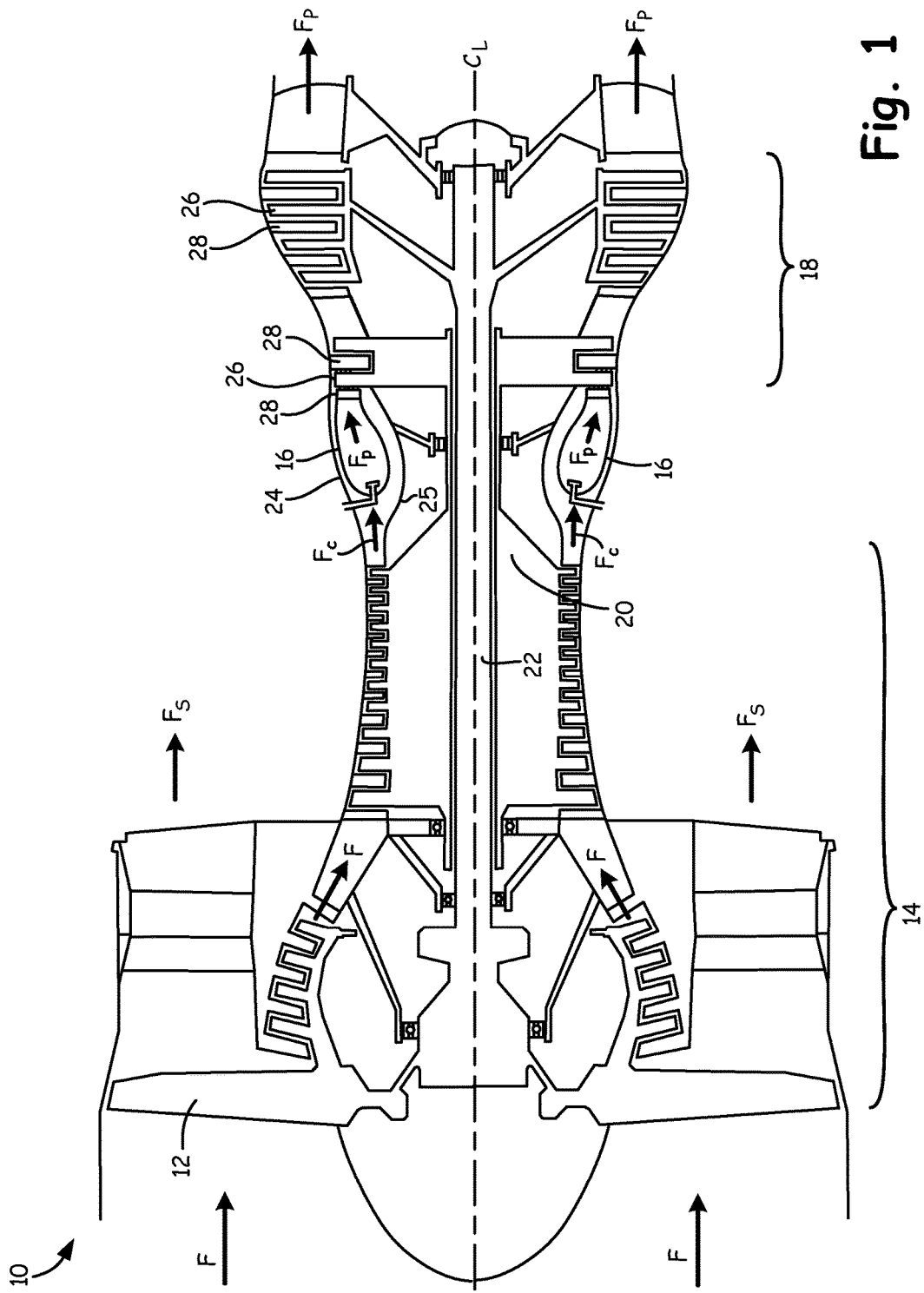
FIG. 1 is a sectional view of a gas turbine engine.

FIG. 1 is a representative illustration of a gas turbine engine. The view in FIG. 1 is a longitudinal sectional view along an engine center line. FIG. 1 shows gas turbine engine 10 including fan 12, compressor 14, combustor 16, turbine 18, high-pressure rotor 20, low-pressure rotor 22, outer casing 24, and inner casing 25. Turbine 18 includes blades 26 and vanes 28.

As illustrated in FIG. 1, fan 12 is positioned along engine center line $C_L$ at one end of gas turbine engine 10. Compressor 14 is adjacent fan 12 along engine center line $C_L$, followed by combustor 16. Combustor 16 is an annular structure that extends circumferentially around engine center line $C_L$. Turbine 18 is located adjacent combustor 16, opposite compressor 14. High-pressure rotor 20 and low-pressure rotor 22 are mounted for rotation about engine center line $C_L$. High-pressure rotor 20 connects a high-pressure section of turbine 18 to compressor 14. Low-pressure rotor 22 connects a low-pressure section of turbine 18 to fan 12. Blades 26 and vanes 28 are arranged throughout turbine 18 in alternating rows. Blades 26 connect to high-pressure rotor 20 and low-pressure rotor 22. Outer casing 24 surrounds turbine engine 10 providing structural support for compressor 14, and turbine 18, as well as containment for a flow of cooling air Fc. Inner casing 25 is generally radially inward from combustor 16 providing structural support for combustor 16 as well as containment for the flow of cooling air Fc.

In operation, air flow F enters compressor 14 through fan 12. Air flow F is compressed by the rotation of compressor 14 driven by high-pressure rotor 20 producing a flow of cooling air Fc. Cooling air Fc flows between combustor 16 and each of outer casing 24 and inner casing 25. A portion of cooling air Fc enters combustor 16, with the remaining portion of cooling air Fc employed farther downstream for cooling other components exposed to high-temperature combustion gases, such as blades 26 and vanes 28. Compressed air and fuel are mixed and ignited in combustor 16 to produce high-temperature, high-pressure combustion gases Fp. Combustion gases Fp exit combustor 16 into turbine section 18. Vanes 28 properly align the flow of combustion gases Fp for an efficient attack angle on subsequent blades 26. The flow of combustion gases Fp past blades 26 drives rotation of both high-pressure rotor 20 and low-pressure rotor 22. High-pressure rotor 20 drives a high-pressure portion of compressor 14, as noted above, and low-pressure rotor 22 drives fan 12 to produce thrust Fs from gas turbine engine 10. Although embodiments of the present invention are illustrated for a turbofan gas turbine engine for aviation use, it is understood that the present invention applies to other aviation gas turbine engines and to industrial gas turbine engines as well.

Figure 2:
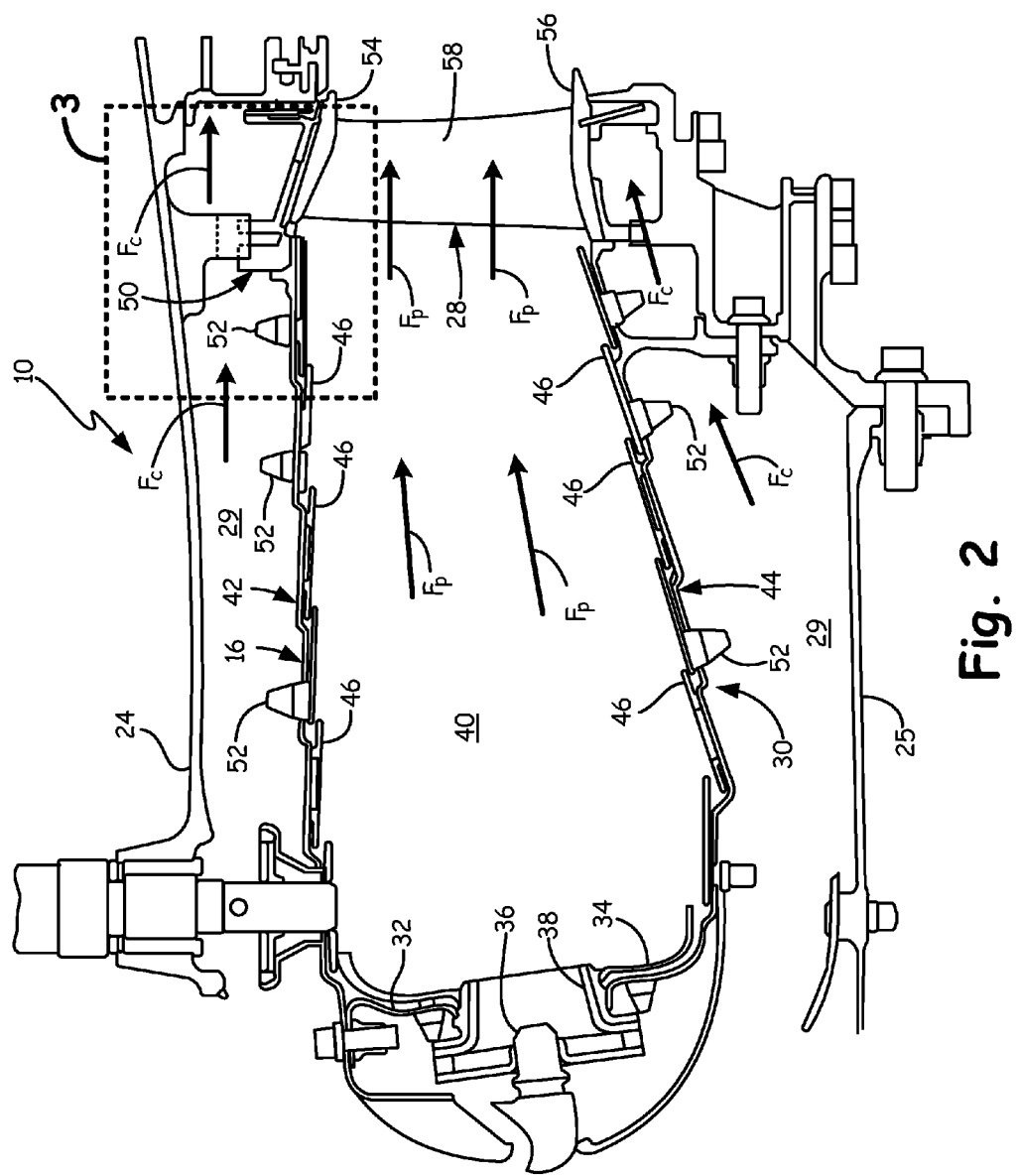
FIG. 2 is an enlarged sectional view of a portion of the gas turbine engine of FIG. 1.

FIG. 2 is an enlarged sectional view of a portion of the gas turbine engine 10 of FIG. 1. FIG. 2 illustrates combustor 16, outer casing 24, inner casing 25, vane 28, and combustor seal 50. Outer casing 24 and inner casing 25 are radially outward and inward, respectively, from combustor 16, thus creating annular plenum 29 around combustor 16. Vane 28 includes outer platform 54, inner platform 56, and airfoil 58 extending radially between inner platform 56 and outer platform 54. Combustor 16 includes combustor liner 30, bulkhead 32, bulkhead heat shield 34, fuel nozzle 36, swirler 38, and combustion chamber 40. Combustor liner 30 includes outer shell 42, inner shell 44, and a plurality of heat shields 46. Combustor 16 is an annular structure that extends circumferentially around engine center line $C_L$; thus combustor liner 30 is arcuate in shape, with an axis coincident with engine center line $C_L$. Although only one vane 28 is shown in FIG. 2, it is understood that the present invention encompasses embodiments including a plurality of vanes 28 as described above in reference to FIG. 1. Combustor seal 50 extends circumferentially around engine center line $C_L$ and may be made of the same material as outer shell 42, for example a high-temperature alloy such as a nickel based or cobalt based alloy. Combustor seal 50 may be a single ring-shaped piece or may be made up of multiple arcuate pieces that together form a ring extending circumferentially around engine center line $C_L$.

Combustion chamber 40 within combustor 16 is bordered radially by combustor liner 30, by bulkhead 32 on an upstream axial end of combustion chamber 40, with a combustion gas opening on a downstream axial end of combustion chamber 40. Swirler 38 connects fuel nozzle 36 to bulkhead 32 through an opening in bulkhead 32. Bulkhead 32 is protected from the hot flow of combustion gases Fp generated within combustion chamber 40 by bulkhead heat shield 34. Heat shields 46 are attached to inner shell 44 to make up the inside diameter portion of combustor liner 30. Similarly, heat shields 46 are attached to outer shell 42 to make up the outside diameter portion of combustor liner 30. Heat shields 46 are attached to outer shell 42 and inner shell 44 by studs 52 projecting from heat shields 46. Combustor seal 50 seals between outer shell 42 at the downstream axial end of combustion chamber 40 and outer platform 54.

In operation, fuel from fuel nozzle 36 mixes with air in swirler 38 and is ignited in combustion chamber 40 to produce the flow of combustion gases Fp for use by turbine 18 as described above in reference to FIG. 1. Combustor liner 30 is cooled by the flow of cooling air Fc flowing from plenum 29 through openings (not shown) in outer shell 42, inner shell 44, and heat shields 46. Leakage of the flow of cooling air Fc between the outer shell 42 and outer platform 54 into the flow of combustion gases Fp is inhibited by combustor seal 50.

Outer platform 54 for each vane 28 may have a slightly unique shape and position relative to outer shell 42 at the downstream axial end of combustion chamber 40. In use, combustor seal 50 may wear against each outer platform 54, to provide a seal surface that more closely matches the unique shape and position of outer platform 54. This is particularly true if combustor seal 50 includes an abradable pad where combustor seal 50 contacts each outer platform 54, as described in U.S. Pat. No. 5,785,492, METHOD AND APPARATUS FOR SEALING A GAS TURBINE STATOR VANE ASSEMBLY, hereby incorporated by reference. While this provides for a better seal quality, this customized relationship between a worn-in combustor seal and outer platform 54 means that the combustor seal may need to be replaced if the relationship between the combustor seal and vanes 28 is disturbed. Such a disturbance may happen, for example, if combustor 16 and vanes 28 are separated and the combustor seal is removed during maintenance of gas turbine engine 10. It is extremely unlikely that once gas turbine engine 10 is reassembled, with the combustor seal reinstalled between combustor 16 and vanes 28, the beneficial wear pattern of the combustor seal would happen to match each outer platform 54 as it did prior to disassembly. Such a mismatch between the combustor seal and outer platform 54 may result seal performance that is worse than a new, unworn combustor seal.

Embodiments of the present disclosure provide a plurality of seal alignment features for ensuring that combustor seal 50 retains the same circumferential alignment relative to outer platform 54. This ensures a substantial match between the beneficial wear pattern of combustor seal 50, and the unique shape and position of outer platform 54 upon reassembly of gas turbine engine 10.

Figure 3:
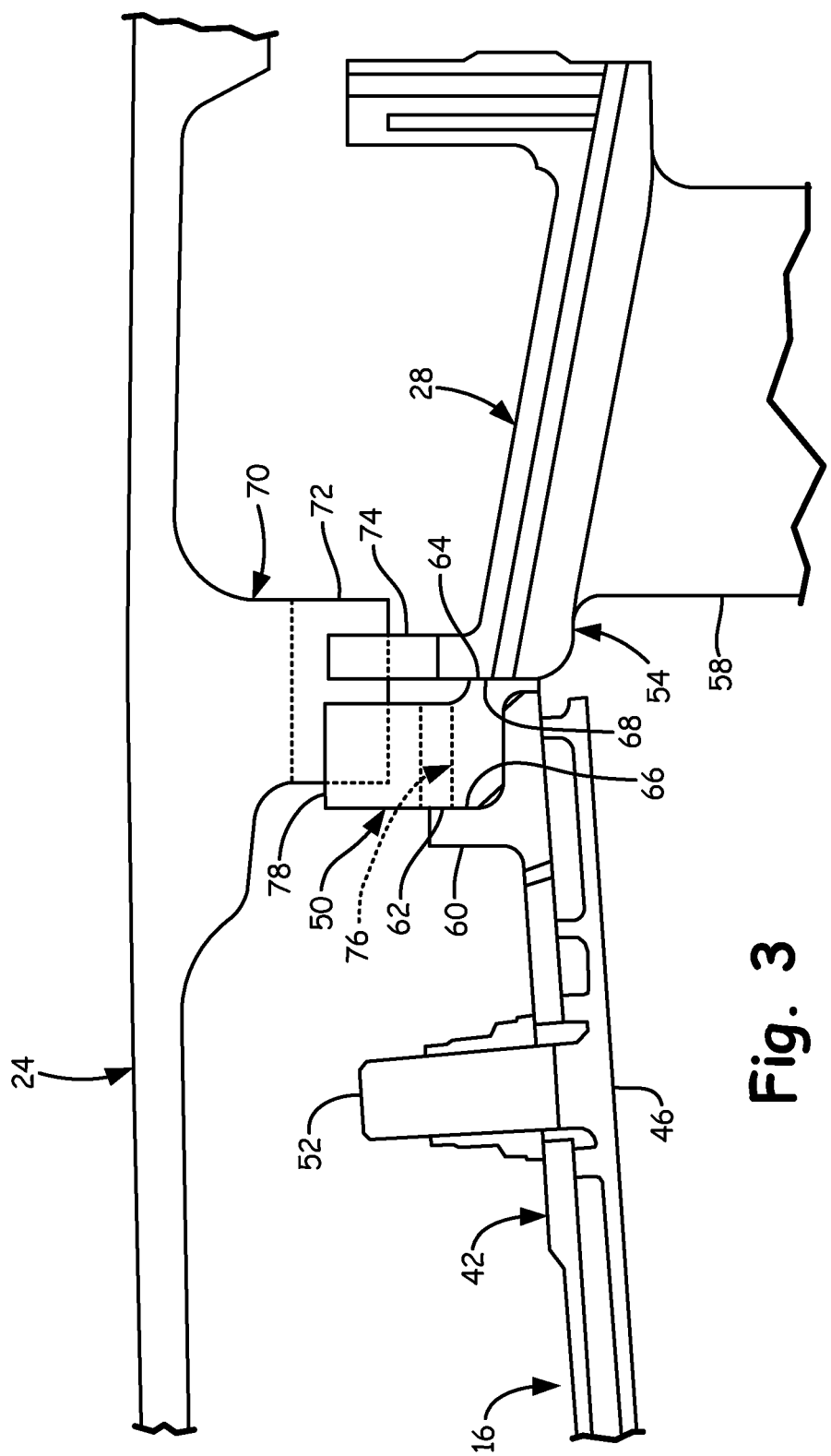
FIG. 3 is an enlarged partial view of the portion of the gas turbine engine shown in FIG. 2.

FIG. 3 is an enlarged partial view of the portion of gas turbine engine 10 as indicated in FIG. 2. As shown in FIG. 3, outer casing 24 includes support structure 70 which is an annular portion of outer casing 24 radially outward from at least combustor seal 50. Support structure 70 includes a plurality of lugs 72 projecting radially inward from support structure 70 and spaced circumferentially around engine center line $C_L$. Lug 72 is a vane alignment feature for aligning and limiting the movement of static structures such as combustor seal 50 and vane 28, as described below. Support structure 70 may be an integral part of outer casing 24 as shown in FIG. 3, or may be a separate component connected directly or indirectly to outer casing 24, such as a vane support structure.

FIG. 3 also shows that outer shell 42 further includes flange 60 near the downstream axial end of outer shell 42. Flange 60 projects substantially radially outward from outer shell 42 and includes flange surface 62. Flange surface 62 faces substantially in the downstream axial direction. Outer platform 54 includes platform surface 64 and vane fork 74. Platform surface 64 faces substantially in the upstream axial direction, opposite flange surface 62. Vane fork 74 engages lug 72 to align vane 28 relative to outer casing 24 and gas turbine engine 10. Combustor seal 50 includes seal body 76, and fork 78. Seal body 76 has an arcuate shape, and includes combustor sealing surface 66 and vane sealing surface 68. Combustor sealing surface 66 and vane sealing surface 68 are substantially parallel to each other. Combustor sealing surface 66 faces substantially upstream, and vane sealing surface 68 faces substantially downstream. Combustor sealing surface 66 is in contact with flange surface 62, and vane sealing surface 68 is in contact with platform surface 64 to seal between combustor 16 and vane 28. Fork 78 is a seal alignment feature that also engages lug 72 as described below in reference to FIGS. 4A and 4B.

In operation, vane sealing surface 68 of combustor seal 50 may wear against platform surface 64 of outer platform 54 to provide a seal surface that more closely matches the unique shape and position of platform surface 54. Both vane fork 74 and fork 78 engage lug 72. Should gas turbine engine 10 be disassembled such that combustor seal 50 is removed, combustor seal 50 may be reinstalled in gas turbine engine 10 by aligning fork 78 with lug 72 to match the beneficial wear pattern on vane sealing surface 68 to outer platform 54.

Figure 4A:
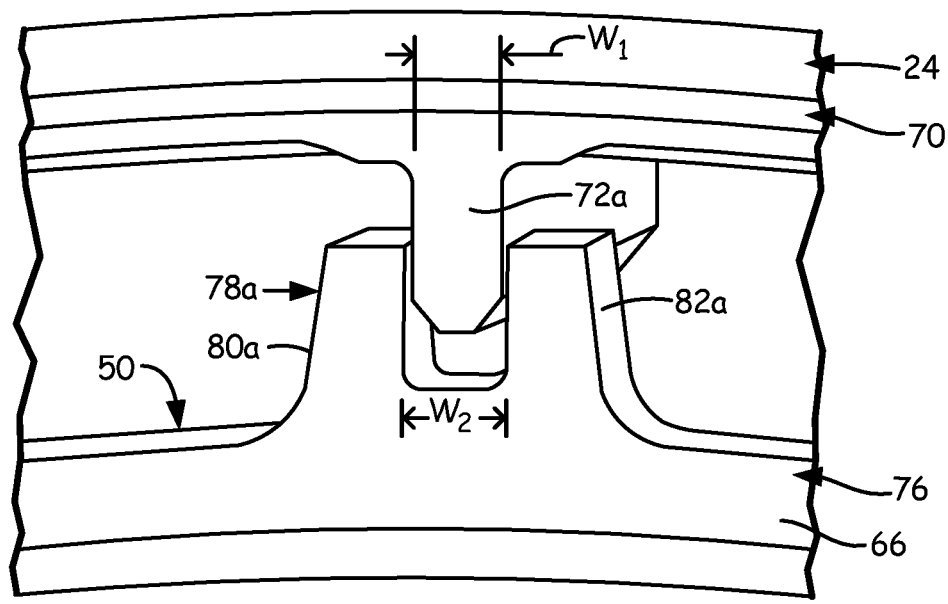
FIGS. 4A and 4B are perspective views of an embodiment of the present disclosure including seal alignment features engaging matching vane alignment features.
Figure 4B:
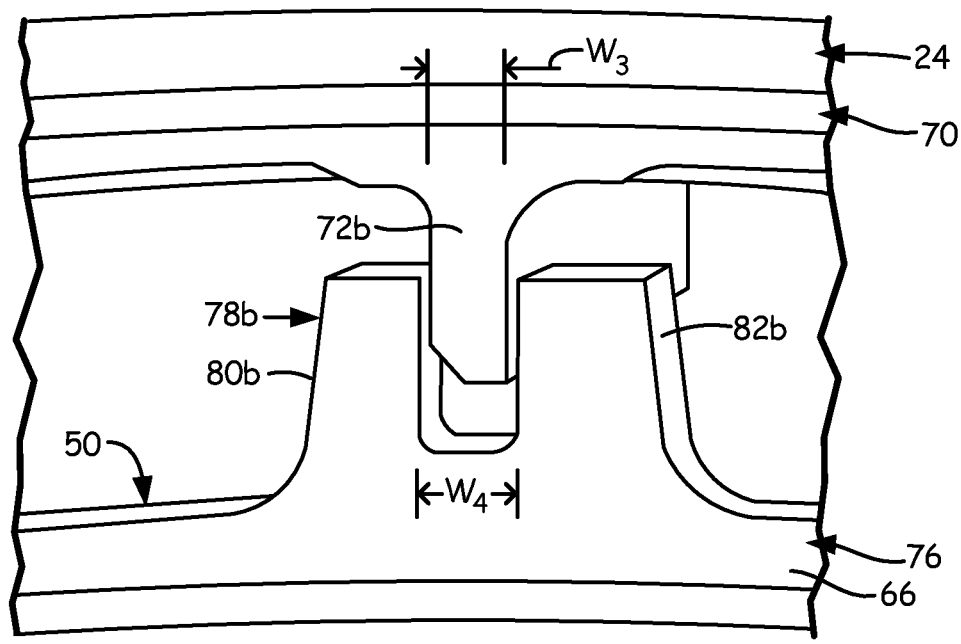

FIGS. 4A and 4B are perspective views of an embodiment of the present disclosure including two types of seal alignment features (fork 78a and fork 78b) engaging matching types of vane alignment features (lug 72a and lug 72b) differentiated by size. FIG. 4A shows combustor seal 50 and support structure 70 of outer casing 24. In the embodiment of FIG. 4A, a vane alignment feature is lug 72a. Lug 72a has width W1 in the circumferential direction. Seal body 76 includes a seal alignment feature, fork 78a. Fork 78a includes prong 80a and prong 82a. Prongs 80a and 82a are separated by width W2 in the circumferential direction. Vane fork 74 is omitted for clarity. Width W1 is less than width W2 to permit fork 78a to engage lug 72a, as shown. Optionally, lug 72a is shown as chamfered to ease the engagement of fork 78a and lug 72a. FIG. 4B shows that support structure 70 also includes another vane alignment feature, lug 72b. Lug 72b has width W3 in the circumferential direction. Seal body 76 also includes another seal alignment feature, fork 78b. Fork 78b includes prong 80b and prong 82b. Prongs 80b and 82b are separated by width W4 in the circumferential direction. Width W3 is less than width W4 to permit fork 78b to engage lug 72b, as shown. Optionally, lug 72b is shown as partially chamfered on to ease the engagement of fork 78b and lug 72b. Importantly, W4 is less than W1 such that should fork 78b be mistakenly aligned with lug 72a, fork 78b cannot engage lug 72a due to interference between prong 80b, prong 82b, and lug 72a.

Figure 5:
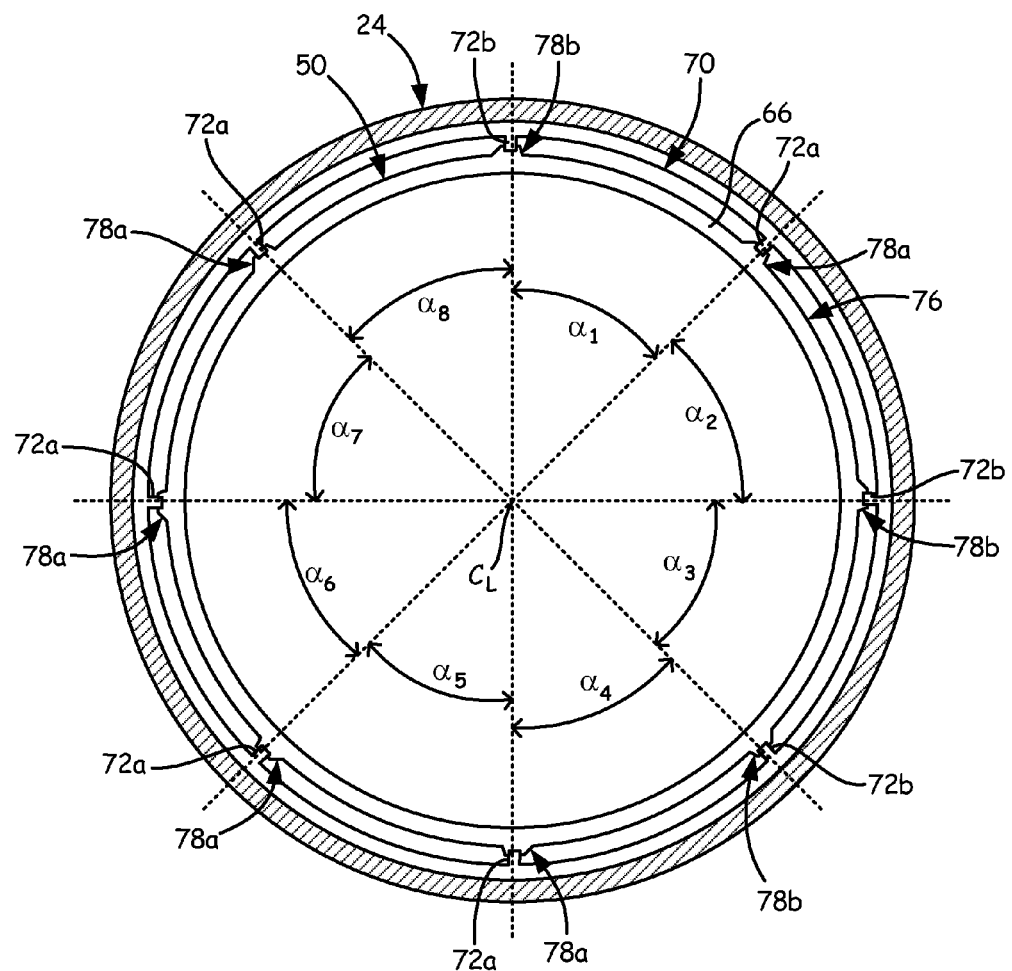
FIG. 5 is a radial cross-section of the gas turbine engine of FIG. 2.

FIG. 5 is a radial cross section of gas turbine engine 10 just upstream of combustor seal 50 facing downstream. Vanes 28 are omitted for clarity. FIG. 5 shows outer casing 24 including support structure 70 and a plurality of lugs 72a and lugs 72b. FIG. 5 also shows combustor seal 50 including seal body 76 and a plurality of forks 78a and forks 78b. In this illustrated embodiment, combustor 50 includes eight sets of seal alignment features spaced circumferentially around centerline $C_L$, the spacing determined by angles $\alpha_1$, $\alpha_2$, $\alpha_3$, $\alpha_4$, $\alpha_5$, $\alpha_6$, $\alpha_7$, and $\alpha_8$, which are equal in this embodiment or about forty-five degrees. The eight sets of seal alignment features include five forks 78a, and three forks 78b. Forks 78a are at approximately forty-five degrees, one hundred eighty degrees, two hundred twenty-five degrees, two hundred seventy degrees, and three hundred fifteen degrees. Forks 78b are at approximately zero degrees, ninety degrees, and one hundred thirty-five degrees. The arrangement of forks 78a relative to forks 78b is such that there is no axis of symmetry. Support structure 70 includes a matching set of five lugs 72a and three lugs 72b spaced circumferentially around centerline $C_L$ with the same spacing and arrangement as the corresponding forks 78a and forks 78b.

Should gas turbine engine 10 be disassembled such that vanes 28 are removed and combustor seal 50 is removed, reinstallation of combustor seal 50 begins with aligning forks 78a and forks 78b with the corresponding lugs 72a and lugs 72b. There is only one arrangement that permits all seal alignment features to engage all vane alignment features. If there is misalignment, then either none of the seal alignment features engage any of the vane alignment features, or combustor seal 50 cannot be installed at all because fork 78b cannot engage lug 72a due to interference between prong 80b, prong 82b, and lug 72a. This is true even if combustor seal 50 were being installed with combustor sealing surface 66 facing downstream and vane sealing surface 68 facing upstream. Thus, with this embodiment, installation of combustor seal 50 is mistake proof. Once combustor seal 50 is installed, vanes 28 are installed by aligning vane forks 74 with lugs 72a and 72b.

Figure 6:
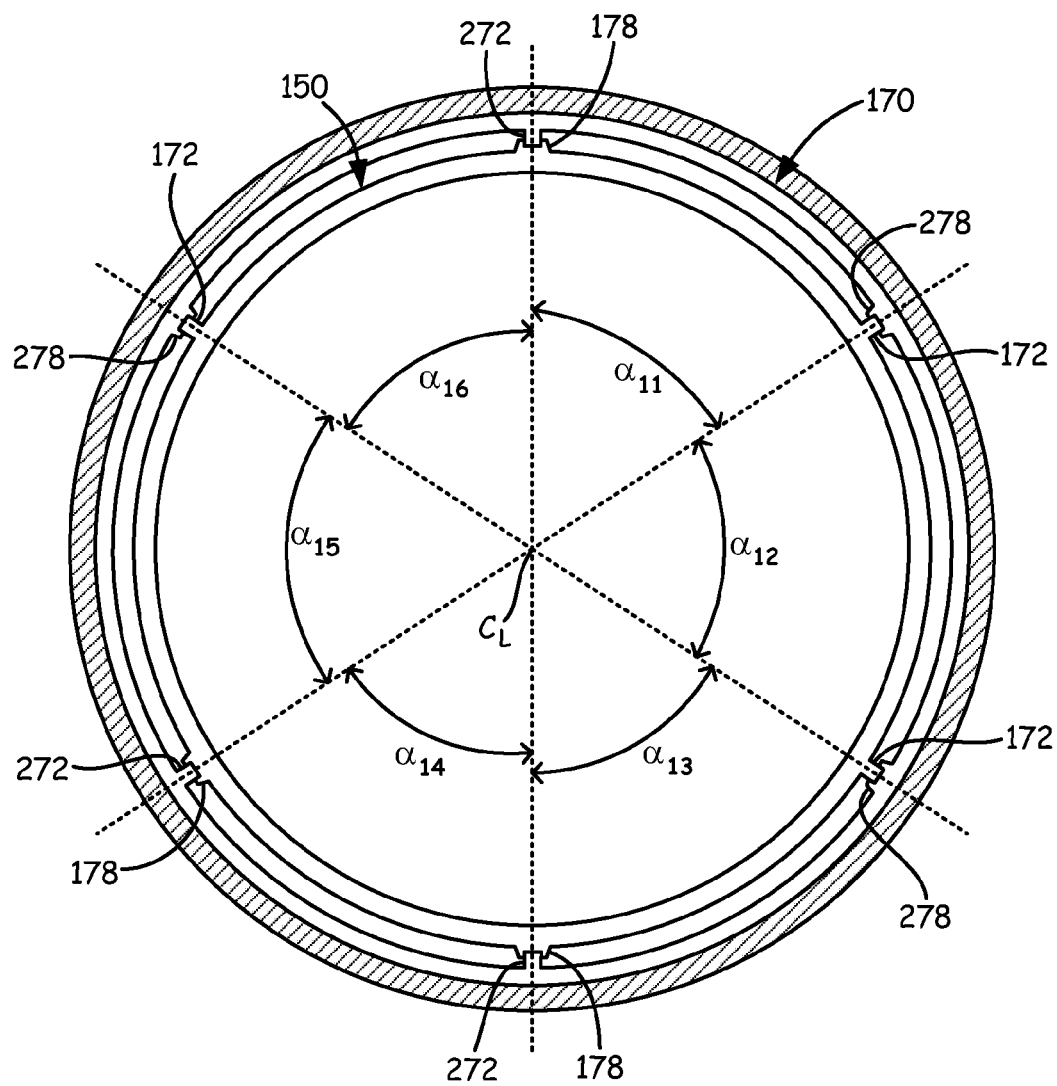
FIG. 6 is a radial cross-section of a portion of a gas turbine engine illustrating another combustor seal in accordance with the present disclosure.

In the embodiments describe above, all of the vane alignment features are lugs 72 and all of the seal alignment features are forks 78. However, it is understood that the present invention encompasses embodiments where vane alignment features include both a plurality of lugs and a plurality of forks while the seal alignment features include a matching plurality of forks and lugs. FIG. 6 is a radial cross-section a portion of gas turbine engine 10 illustrating another combustor seal in accordance with the present disclosure. Gas turbine engine 10 is as described for the previous embodiments except that combustor seal 150 replaces combustor seal 50, support structure 170 replaces support structure 70, and some of vanes 28 have vane lugs instead of vane forks 74. FIG. 6 illustrates an embodiment of the present invention including two types of seal alignment features (lugs 172 and forks 178) engaging matching types of vane alignment features (forks 278 and lugs 272) differentiated by type of alignment feature.

FIG. 6 is a radial cross section of gas turbine engine 10 just upstream of combustor seal 150 facing downstream. Vanes 28 are omitted for clarity. FIG. 6 shows outer casing 24 including support structure 170 and a plurality of lugs 272 and forks 278. FIG. 6 also shows combustor seal 150 including seal body 76 and a plurality of lugs 172 and forks 178. In this illustrated embodiment, combustor 150 includes six sets of seal alignment features spaced circumferentially around centerline $C_L$, the spacing determined by angles $\alpha_{11}$, $\alpha_{12}$, $\alpha_{13}$, $\alpha_{14}$, $\alpha_{15}$, and $\alpha_{16}$, which are equal in this embodiment or about sixty degrees. The six sets of seal alignment features include three lugs 172, and three forks 178. Lugs 172 are at approximately sixty degrees, one hundred twenty degrees, and three hundred degrees. Forks 178 are at approximately zero degrees, one hundred eighty degrees, and two hundred forty degrees. The arrangement of lugs 172 relative to forks 178 is such that there is no axis of symmetry. Support structure 170 includes a matching set of three forks 278 and three lugs 272 spaced circumferentially around centerline $C_L$ with the same spacing and arrangement as the corresponding lugs 172 and forks 178. Importantly, should fork 178 be mistakenly aligned with fork 278, fork 178 cannot engage fork 278 due to interference between their identical structures. Similarly, lug 172 cannot engage lug 272 due to interference between their identical structures.

As with the embodiment described above, there is only one arrangement that permits all seal alignment features to engage all vane alignment features. If there is misalignment, then either none of the seal alignment features engage any of the vane alignment features, or combustor seal 150 cannot be installed at all because fork 178 cannot engage fork 278 and lug 172 cannot engage lug 272 due to interference their identical structures. This is true even if combustor seal 150 were being installed with combustor sealing surface 66 facing downstream and vane sealing surface 68 facing upstream. Thus, with this embodiment, installation of combustor seal 150 is mistake proof.

Embodiments of the present invention permit the reinstallation of a worn-in combustor seal in such a way as to preserve the original circumferential alignment to the outer platforms of the vanes. This ensures a substantial match between the beneficial wear pattern of the combustor seal, and the unique shape and position of the vanes upon reassembly of the gas turbine engine. The seal alignment features are such that installation of the worn-in combustor seal is mistake proof, in that it can only be installed in one orientation.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

Discussion of Possible Embodiments

The following are non-exclusive descriptions of possible embodiments of the present invention.

A combustor seal for use between a downstream end of a combustor and a turbine vane includes a seal body and a plurality of seal alignment features. The plurality of seal alignment features projects from the seal body. The seal alignment features are arranged such that there is only one alignment of the combustor seal with the turbine vane.

The seal of the preceding paragraph can optionally include, additionally and/or alternatively, any one or more of the following features, configurations and/or additional components:

the plurality of seal alignment features project radially outward from the seal body;

the plurality of seal alignment features are spaced along the seal body at equal intervals in a circumferential direction;

the plurality of seal alignment features includes at least two seal alignment features differentiated by at least one of size and structure;

the plurality of seal alignment features includes a first seal alignment feature having a fork structure including at least two prongs separated in a circumferential direction by a first width, and a second seal alignment feature having a fork structure including at least two prongs separated in the circumferential direction by a second width, wherein the first width is greater than the second width;

the plurality of seal alignment features includes a first seal alignment feature having a lug structure including a first width in a circumferential direction, and a second seal alignment feature having a lug structure including a second width in the circumferential direction, wherein the first width is greater than the second width; and the plurality of seal alignment features includes a first seal alignment feature having a fork structure, and a second seal alignment feature having a lug structure.

A gas turbine engine including an outer casing, a combustor within the outer casing, a plurality of vane alignment features within and connected to the outer casing, a turbine vane downstream of the combustor, and a combustor seal. The turbine vane includes an outer platform surface facing in an upstream axial direction, and an alignment feature for engaging with the plurality of vane alignment features to align the turbine vane to the outer casing. The combustor seal is in contact with the platform surface and a downstream end of the combustor configured to seal a gap defined between the combustor and the outer platform surface of the turbine vane. The combustor seal includes a seal body, and a plurality of seal alignment features projecting from the seal body. The plurality of seal alignment features is configured to engage the plurality of vane alignment features for aligning the combustor seal relative to the turbine vane, and arranged such that there is only one alignment in which all of the plurality of seal alignment features engage all of the plurality of vane alignment features.

The engine of the preceding paragraph can optionally include, additionally and/or alternatively, any one or more of the following features, configurations and/or additional components:

the vane alignment features are integral with the outer casing;

the plurality vane alignment features project radially inward from the outer casing, and the plurality of seal alignment features project radially outward from the seal body;

the seal alignment features are spaced along the seal body at equal intervals in a circumferential direction;

the plurality of seal alignment features includes at least two seal alignment features differentiated by at least one of size and structure; and the plurality of seal alignment features includes at least two seal alignment features differentiated by at least one of size and structure;

the plurality of vane alignment features includes a first vane alignment feature having a lug structure including a first width in a circumferential direction, and a second vane alignment feature having a lug structure including a third width in the circumferential direction, and the plurality of seal alignment features includes a first seal alignment feature having a fork structure including at least two prongs separated in the circumferential direction by a second width, the second width greater than the first width such that the first seal alignment feature can engage the first vane alignment feature, and a second seal alignment feature having a fork structure including at least two prongs separated in the circumferential direction by a fourth width, the fourth width greater than the third width such that the second seal alignment feature can engage the second vane alignment feature in which the first width is greater than the fourth width such that the second seal alignment feature cannot engage the first vane alignment feature;

the plurality of vane alignment features includes a first vane alignment feature having a fork structure including at least two prongs separated in a circumferential direction by a first width, and a second vane alignment feature having a fork structure including at least two prongs separated in the circumferential direction by a third width, and the plurality of seal alignment features includes a first seal alignment feature having a lug structure including a second width in the circumferential direction, the first width greater than the second width such that the first seal alignment feature can engage the first vane alignment feature, and a second seal alignment feature having a lug structure including a fourth width in the circumferential direction, the third width greater than the fourth width such that the second seal alignment feature can engage the second vane alignment feature in which the fourth width is greater than the first width such that the first seal alignment feature cannot engage the first vane alignment feature; and the plurality of vane alignment features includes a first vane alignment feature having a lug structure, and a second vane alignment feature having a fork structure including at least two prongs, and the plurality of seal alignment features includes a first seal alignment feature having a fork structure including at least two prongs such that the first seal alignment feature can engage the first vane alignment feature, and a second seal alignment feature having a lug structure such that the second seal alignment feature can engage the second vane alignment feature in which the second seal alignment feature cannot engage the first vane alignment feature, and the first seal alignment feature cannot engage the second vane alignment feature.

A method of installing a combustor seal into a gas turbine engine includes inserting the combustor seal into the gas turbine engine axially adjacent a vane support, and rotating the combustor seal about an engine center axis to align the combustor seal relative to the vane support.

The method of the preceding paragraph can optionally include, additionally and/or alternatively, any one or more of the following features, configurations and/or additional components:

the combustor seal includes a plurality of seal alignment features projecting radially outward from engine centerline and operatively associated with the vane support;

engaging the plurality of seal alignment features with a plurality of vane alignment features projecting radially inward from the vane support such that all of the plurality of seal alignment features engage all of the plurality of vane alignment features;

there is only one alignment in which all of the plurality of seal alignment features engage all of the plurality of vane alignment features; and the plurality of seal alignment features includes at least a first seal alignment feature and a second seal alignment feature, the plurality of vane alignment features includes at least a first vane alignment feature and a second vane alignment feature, the first seal alignment feature for engaging with the first vane alignment feature, and the second seal alignment feature for engaging with the second vane alignment feature, in which the first alignment feature cannot engage the second vane alignment feature.

The invention claimed is:

1. A combustor seal for use between a downstream end of a combustor and a turbine vane assembly having a plurality of circumferentially spaced vane alignment features, the combustor seal comprising:
   a seal body; and
   a plurality of circumferentially spaced seal alignment features projecting from the seal body, each seal alignment feature being positioned and configured to mate with a corresponding vane alignment feature, wherein one of the seal alignment features is a different size from the rest of the seal alignment features such that there is only one alignment position of the combustor seal with respect to the turbine vane assembly in which the differently sized seal alignment feature engages and mates with a correspondingly sized vane alignment feature that is a second different size from the rest of the vane alignment features, wherein the plurality of seal alignment features includes:
      a first fork including a first prong and a second prong, wherein the first prong and the second prong are separated in a circumferential direction by a first width, wherein the first fork is shaped to receive a first vane alignment feature; and
      a second fork including a third prong and a fourth prong, wherein the third prong and the fourth prong are separated in the circumferential direction by a second width, and wherein the second fork is circumferentially spaced from the first fork, wherein the second fork is shaped to receive a second vane alignment feature;
   wherein the first width is greater than the second width.

2. The seal of claim 1, wherein the plurality of seal alignment features project radially outward from the seal body.

3. The seal of claim 1, wherein the plurality of seal alignment features are spaced along the seal body at equal intervals in the circumferential direction.

4. The seal of claim 1, wherein each of the plurality of seal alignment features comprises a fork, wherein the plurality of seal alignment features includes at least two seal alignment features differentiated by size.

5. A method of installing the combustor seal of claim 1 into a gas turbine engine, the method comprising:
   inserting the combustor seal into the gas turbine engine axially adjacent a vane support;
   rotating the combustor seal about an engine center axis to align the combustor seal relative to the vane support; and
   engaging the combustor seal with the vane support.

6. The method of claim 5, wherein the plurality of seal alignment features project radially outward from a centerline of the gas turbine engine and are operatively associated with the vane support.

7. The method of claim 6, further including engaging the plurality of seal alignment features with the plurality of vane alignment features such that all of the plurality of seal alignment features engage all of the plurality of vane alignment features.

8. The method of claim 7, wherein the first fork cannot engage the second vane alignment feature.

9. A gas turbine engine comprising:
an outer casing;
a combustor within the outer casing;
a plurality of vane alignment features within and connected to the outer casing, wherein the plurality of vane alignment features includes: a first lug including a first width in a circumferential direction; and a second lug including a third width in the circumferential direction;
a turbine vane downstream of the combustor, the turbine vane including: an outer platform surface facing in an upstream axial direction; and
an alignment feature for engaging with the plurality of vane alignment features to align the turbine vane to the outer casing; and
a combustor seal in contact with the platform surface and a downstream end of the combustor configured to seal a gap defined between the combustor and the outer platform surface of the turbine vane, the combustor seal including: a seal body, and
a plurality of seal alignment features projecting from the seal body configured to engage the plurality of vane alignment features for aligning the combustor seal relative to the turbine vane, wherein one of the seal alignment features is a different size from the rest of the seal alignment features such that there is only one alignment position of the combustor seal with respect to a turbine vane assembly in which the differently sized seal alignment feature engages and mates with a correspondingly sized vane alignment feature that is a second different size from the rest of the vane alignment features, wherein the plurality of seal alignment features includes:
a first fork including a first prong and a second prong, wherein the first prong and the second prong are separated in the circumferential direction by a second width, the second width greater than the first width such that the first fork can engage the first lug; and
a second fork including a third prong and a fourth prong, wherein the third prong and the fourth prong are separated in the circumferential direction by a fourth width, the fourth width greater than the third width such that the second fork can engage the second lug, and wherein the second fork is circumferentially spaced from the first fork;
wherein the first width is greater than the fourth width such that the second fork cannot engage the first lug.

10. The engine of claim 9, wherein the vane alignment features are integral with the outer casing.

11. The engine of claim 9, wherein the plurality vane alignment features project radially inward from the outer casing, and the plurality of seal alignment features project radially outward from the seal body.

12. The engine of claim 9, wherein the seal alignment features are spaced along the seal body at equal intervals in the circumferential direction.

13. The engine of claim 9, wherein the plurality of seal alignment features includes at least two seal alignment features differentiated by size; and the plurality of vane alignment features includes at least two vane alignment features differentiated by size.

* * * * *